US006578708B2

(12) United States Patent
Barnett

(10) Patent No.: US 6,578,708 B2
(45) Date of Patent: Jun. 17, 2003

(54) PORTABLE LAPTOP WORKSTATION

(76) Inventor: Donna Barnett, 16 Lake Twintree Place S.E., Calgary Alberta (CA), T2J 2X5

( * ) Notice: Subject to any disclaimer, the term of this patent is extended or adjusted under 35 U.S.C. 154(b) by 98 days.

(21) Appl. No.: 09/814,732

(22) Filed: Mar. 23, 2001

(65) Prior Publication Data

US 2002/0134697 A1 Sep. 26, 2002

(51) Int. Cl.⁷ .............................................. B65D 85/00
(52) U.S. Cl. ............................ 206/320; 206/576; 190/1; 312/237
(58) Field of Search ............................. 206/320, 576; 190/1, 10, 11, 12, 31, 18 A; 312/237, 240, 243, 244, 902

(56) References Cited

U.S. PATENT DOCUMENTS

| | | | | | |
|---|---|---|---|---|---|
| 676,539 A | * | 6/1901 | Hall | ............................. | 190/10 |
| 893,694 A | * | 7/1908 | Allenson | ..................... | 108/38 |
| 1,694,470 A | * | 12/1928 | Hursh | ......................... | 190/10 |
| 2,604,959 A | * | 7/1952 | Arbib | ......................... | 190/11 |
| 3,297,118 A | * | 1/1967 | Van Skyhawk et al. | ........ | 190/1 |
| 4,564,091 A | * | 1/1986 | Coneglio | ................... | 108/102 |
| 4,966,258 A | * | 10/1990 | Hawley | ..................... | 190/12 R |
| 5,437,367 A | * | 8/1995 | Martin | ...................... | 190/107 |
| 5,485,922 A | * | 1/1996 | Butcher | ..................... | 190/109 |
| 5,676,223 A | * | 10/1997 | Cunningham | ................ | 190/109 |
| 5,730,282 A | * | 3/1998 | Bureau | ........................ | 190/11 |
| 5,762,170 A | * | 6/1998 | Shyr et al. | .................. | 190/109 |
| 5,941,352 A | * | 8/1999 | Lee | .............................. | 190/11 |

\* cited by examiner

Primary Examiner—Mickey Yu
Assistant Examiner—Troy Arnold
(74) Attorney, Agent, or Firm—Norman M. Cameron

(57) ABSTRACT

A combined carrying case and workstation for computer components includes a first shell having a first cavity therein. A second shell is pivotally connected to the first shell for pivoting between a closed position, where the second shell is against the first shell to enclose at least a first portion of the first cavity, and an open position where the second shell extends generally perpendicular to the closed position. There is a frame having a stand and being extensibly mounted on the first shell for extension between a retracted position for transport, where the stand is adjacent to the first shell, and an extended position for workstation use, where the first shell is spaced-apart above the stand when the stand is positioned on a flat, horizontal surface. Preferably there is a third shell pivotally connected to the first shell for pivoting between a closed position, where the third shell is against the first shell to enclose a second portion of the first cavity, and an open position, where the third shell extends generally perpendicular to the closed position of the third shell.

11 Claims, 7 Drawing Sheets

PORTABLE LAPTOP WORKSTATION

BACKGROUND OF THE INVENTION

This invention relates to computer workstations and, in particular, to workstations for laptop computers which can be folded and transported as carry-on luggage for aircraft.

Business travelers often carry laptop computers which many regard as essential equipment. These computers are accompanied by such accessories as printers and power bars. Such travelers often encounter hotel rooms or other accommodation lacking suitable furniture for setting up the computers and related equipment. Sometimes travellers resort to operating laptops on hotel beds which is disadvantageous for proper operation of the computer from several points of view. Often proper typing posture cannot be achieved on furniture available. Also damage to the computer can result from operation on uneven surfaces, such as a bed, because cooling of the computer is impaired.

Another problem is that the traveler usually must disassemble the laptop computer from related equipment, such as the printer and power bar, for transport. This not only consumes time, for the disassembly as well as reassembly at a new location, but often leads to loss of components such as cables and power adapters, which may be forgotten when the traveler leaves a temporary accommodation.

As a result, there is a need for an improved apparatus which allows the traveler to conveniently set up a laptop computer and related equipment at a temporary location and readily pack it and move it to another location, preferably as carry-on luggage for air travel.

The prior art reveals a number of attempts to provide portable computer workstations. For example, U.S. Pat. No. 4,526,399 to Holtz shows a cart support for a computer printout. The cart includes two shells which pull out forwardly. However it does not have a case-like structure when folded to provide sufficient storage for computers and related components.

U.S. Pat. No. 5,961,134 to Congleton et al. shows an apparatus for housing and transporting a portable computer. The unit is suitcase-like when folded. There is a shelf for the computer at the top of the telescopic handle.

U.S. Pat. No. 5,529,322 to Barton shows a combination transport device and portable work surface. There is a suitcase which is removed in order to configure the cart as a workstation. There is only a single shelf and the unit does not form a self-contained storage compartment, when folded, which is adequate for a laptop and typical accessories including a printer.

U.S. Pat. No. 5,437,367 shows a device similar to the patent to Congleton in that the shelf for the computer is located at the top of the handle.

These prior art devices have not fully met the needs of the traveler. In some cases the units do not provide stable workstations. In other cases there is not sufficient storage for the portable computer and related components. In particular, none of them appears to be well-suited for leaving the computer, printer, power bars and other such components connected together during transport.

It is therefore an object of the invention to provide an improved apparatus for storing laptop computers and related accessories which can fold to carry-on luggage configuration for aircraft.

It is another object of the invention to provide an improved apparatus for storing laptop computers and related accessories whereby the computer can remain connected to the accessories during transport.

It is a further object of the invention to provide an improved apparatus for storing laptop computers and related accessories which can extend to form a workstation for the computer and accessories.

It is a still further object of the invention to provide an improved apparatus for storing and transporting laptop computers which is rugged in construction and simple to use and operate.

SUMMARY OF THE INVENTION

According to the invention there is provided a combined carrying case and workstation for computer components. This includes a first shell having a cavity therein. There is a second shell pivotally connected to the first shell for pivoting between a closed position, where the second shell is against the first shell, to enclose at least a first portion of the first cavity, and an open position where the second shell extends perpendicular to the closed position. There is a frame having a stand and being extensibly mounted on the first shell for extension between a retracted position for transport, where the stand is adjacent to the first shell, and an extended position for workstation use, where the first shell is spaced-apart above the stand when the stand is positioned on a flat, horizontal surface.

Preferably the combined carrying case and workstation has a third shell pivotally connected to the first shell for pivoting between a closed position, where the third shell is against the first shell to enclose a second portion of the first cavity, and an open position, where the third shell extends generally perpendicular to the closed position of the third shell.

DETAILED DESCRIPTION OF THE PREFERRED EMBODIMENTS

Figure 1:
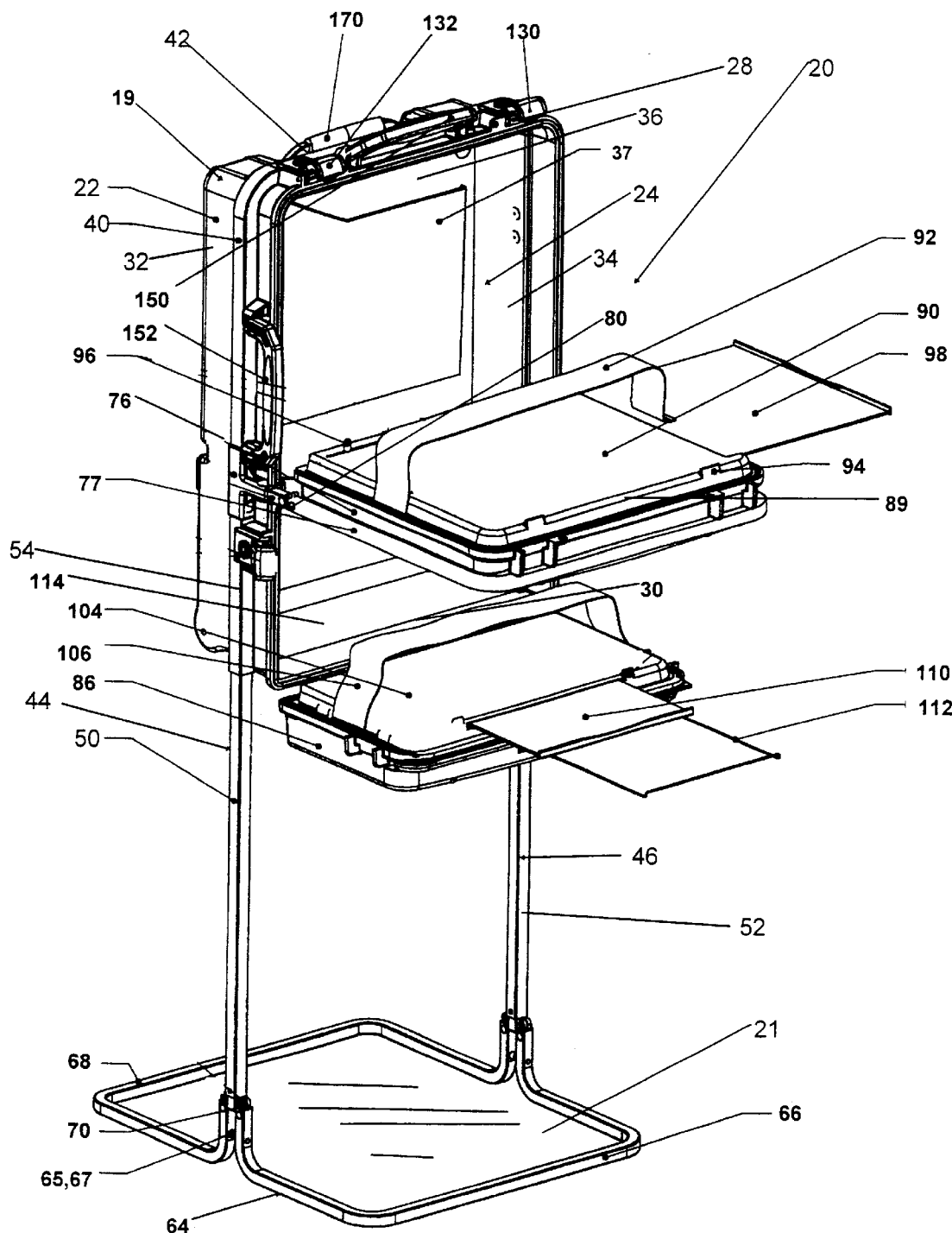
FIG. 1 is an isometric view of a combined carrying case and workstation for computer components, shown in the open and extended position for use as a workstation.

Referring to the drawings, and first to FIG. 1, this shows a combined carrying case and workstation apparatus 20 for computer components in an unfolded and extended position for use as a workstation on a flat horizontal surface 21. The apparatus includes a case 19 having first shell 22 with a cavity 24 therein. The shell 22 is generally similar to one-half of a conventional piece of luggage, being generally rectangular and having a front panel 26, shown best in FIG.

4, a top panel 28, a bottom panel 30 and opposite side panels 32 and 34. An opening 36 is located at the back of the shell 22 opposite the front panel 26. An organizer 37 is mounted within the shell 22.

Figures 3, 4:
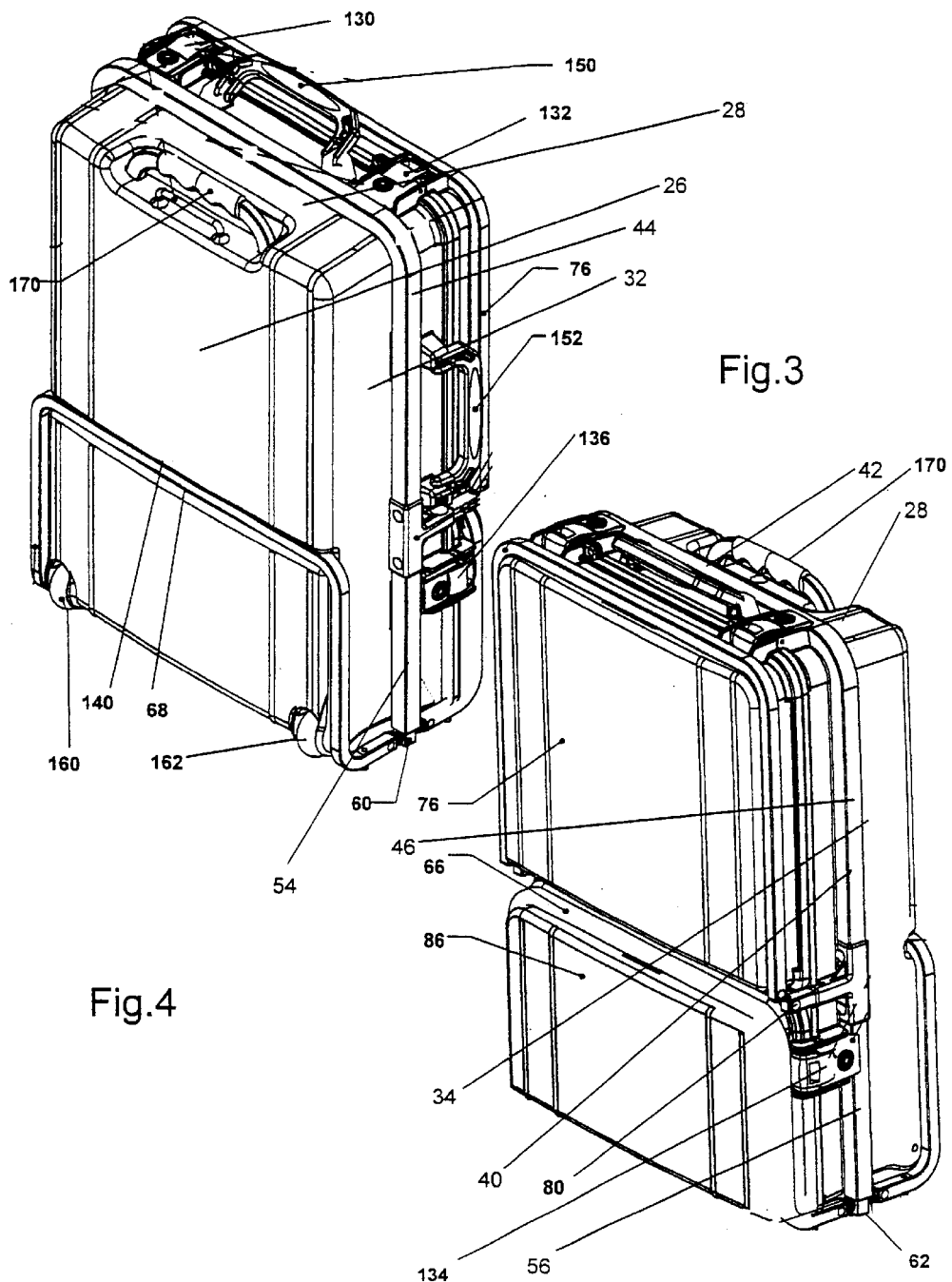
FIG. 3 is a front, top isometric view thereof in the folded position for transport as carry-on luggage.
FIG. 4 is a rear, top isometric view thereof.

There is a frame 40 which is generally U-shaped, with a top member 42 extending along the top panel 28 as seen best in FIG. 3. Side members 44 and 46 extend along side panels 32 and 34 respectively as seen best in FIG. 3 and FIG. 4. The side members are telescopic, having extensions 50 and 52 respectively, shown in FIG. 1, which are telescopically received within portions 54 and 56 extending along the sides of the first shell. The side members have bottoms 60 and 62 respectively. Ends of the side members and the extensions 50 and 52 haves apertures for small steel balls which are attached to a spring-activated lever. The balls partially protrude through the apertures to maintain the apparatus in the position of FIG. 1 or the position of FIGS. 3 and 4.

Figure 5:
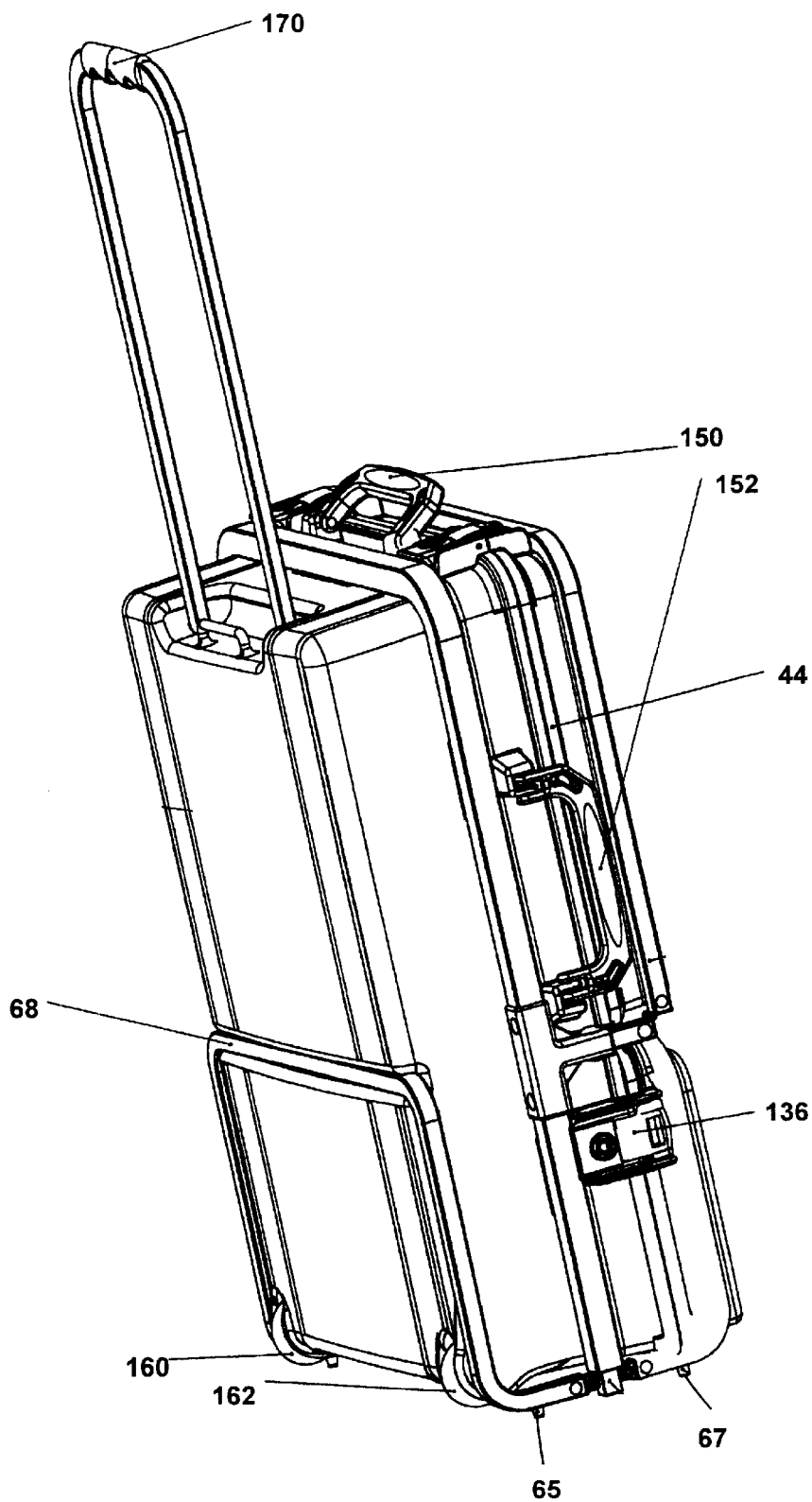
FIG. 5 is a side, front isometric view thereof showing the telescopic handle thereof extended.
Figure 6:
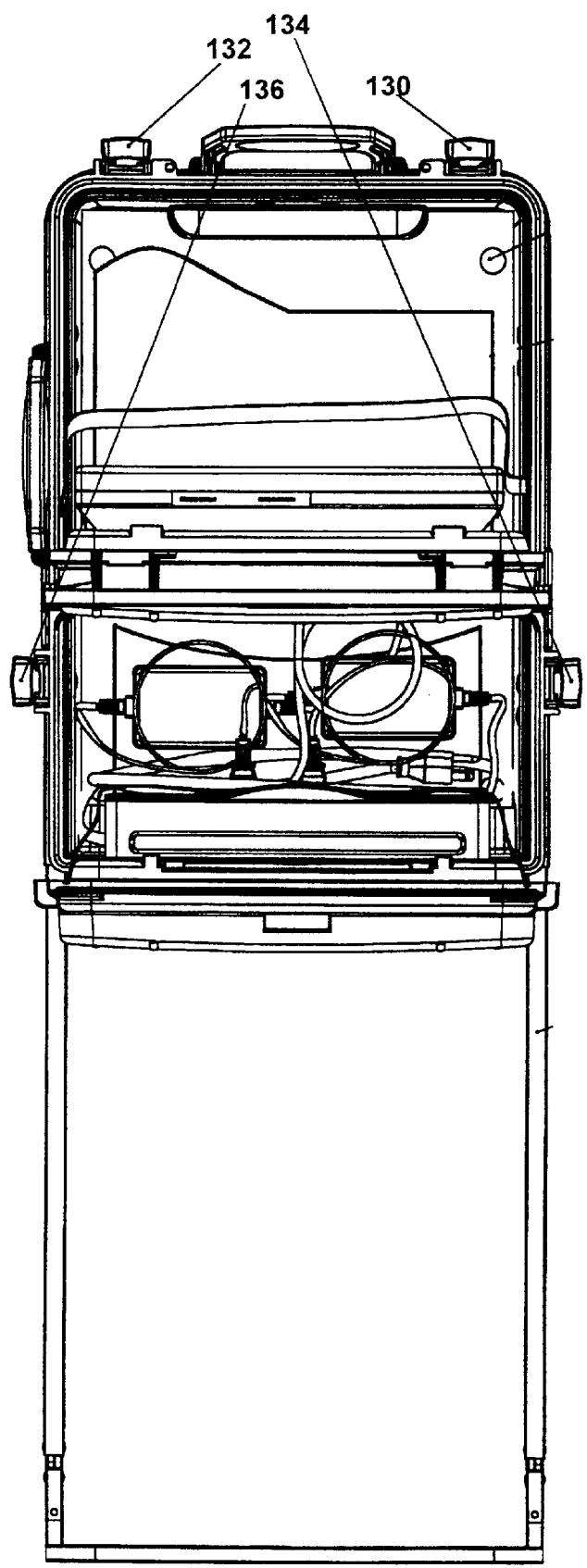
FIG. 6 is an elevation thereof showing the frame and stand extended and the shells thereof opened with a computer and printer mounted thereon.

A stand 64 comprises a pair of U-shaped supports 66 and 68 which are hingedly connected to the bottoms of the side members 44 and 46 by a plurality of pins 70 as seen in FIG. 1. In the position shown in FIG. 1, the supports are in support positions where they are on opposite sides of the side members and extend generally perpendicular to the side members. A ratchet mechanism keeps the supports in the position of FIG. 1. Standoff lock 65 and standoff 67, shown in FIG. 1 and FIG. 5, lock together to prevent the structure from collapsing. The standoff lock has a protruding ring around its perimeter while the standoff has a matching depression within the inside of its body. The device is engaged by applying pressure and is disengaged by pulling the device.

Figure 2:
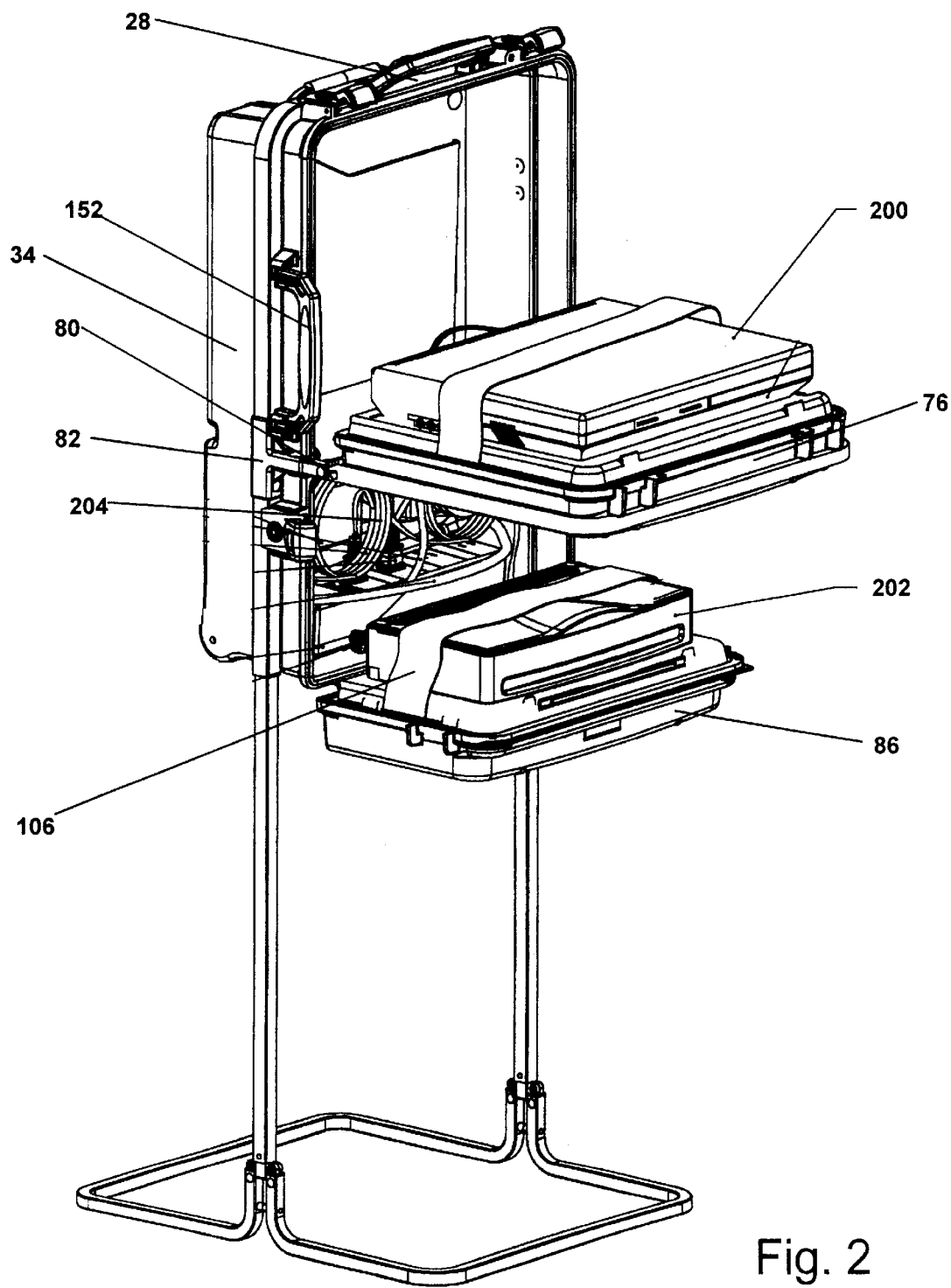
FIG. 2 is a view similar to FIG. 1 showing a computer and printer mounted thereon.

The apparatus includes a second shell 76 which is generally similar to the first shell 22, but smaller. The second shell has a frame 77 which is pivotally connected to the first shell by a pin 80 at a location on each side thereof located below the top panel 28 when the unit is positioned for use as a workstation as seen in FIG. 2. The pin 80 on each side is connected to a T-shaped member 82 on the frame. The second shell is pivotable about the pins between a closed position, shown in FIGS. 3 and 4, where the second shell is against the first shell, and an open position, shown in FIG. 1, where the second shell extends generally perpendicular to its closed position. In the closed position the second shell encloses a first portion of the cavity 24 extending between the top panel 28 and the pins 80.

There is also a third shell 86 which is connected pivotally to the first shell adjacent bottom panel 30. The third shell pivots between a closed position, shown in FIG. 3, where the third shell is against the first shell, and an open position, shown in FIG. 1, where the third shell extends generally perpendicular to the closed position of the third shell. When closed, the third shell encloses a second portion of the cavity 24 between the second shell and the bottom panel.

Figure 7:
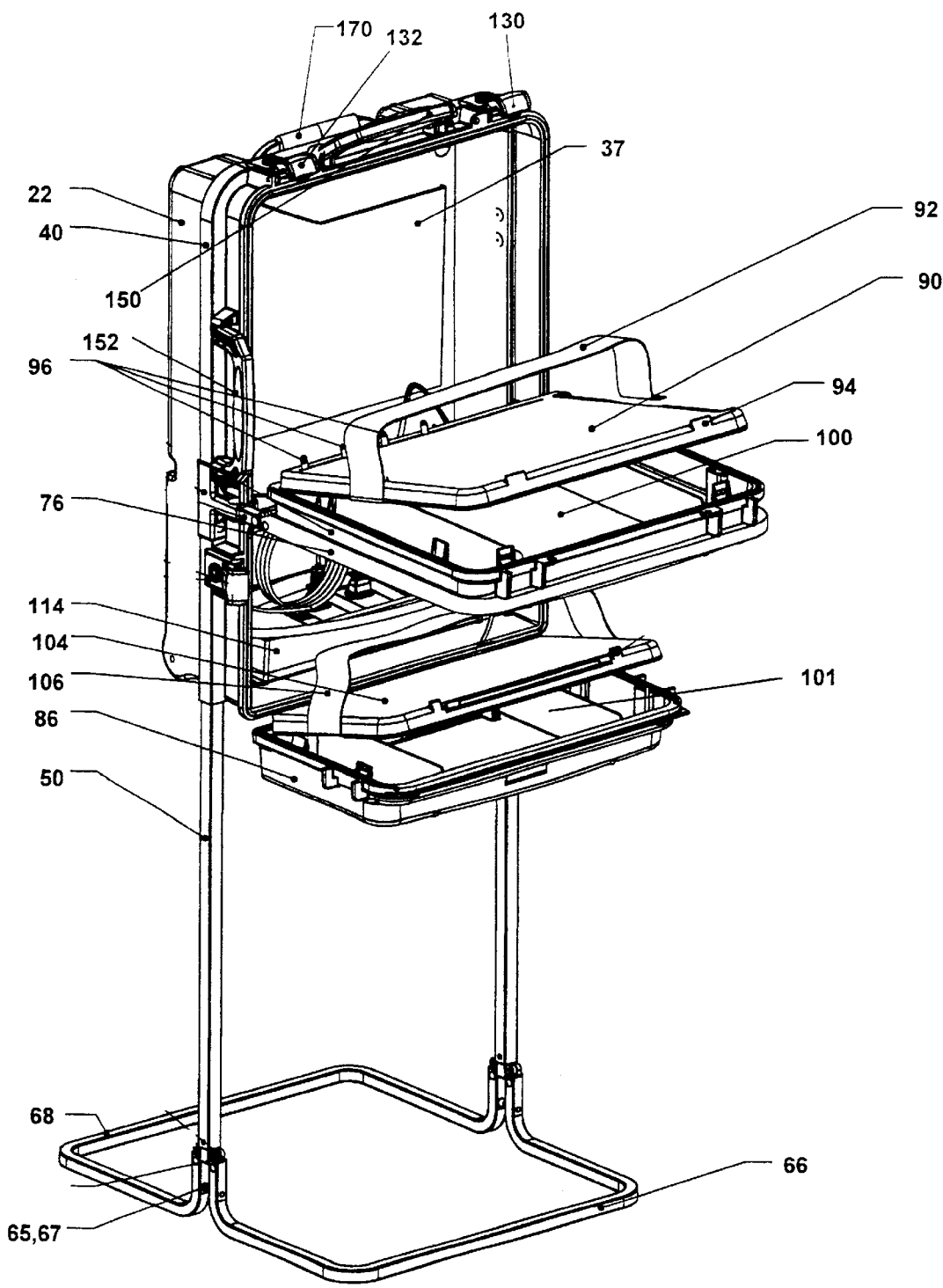
FIG. 7 is a view similar to FIG. 1, showing the work surfaces thereof opened to show the storage spaces below.

As may be seen in FIG. 1, the second shell has a platform 89 with a flat, generally rectangular working surface 90, forming the top thereof when the second shell is open. There is an adjustable strap 92 on the second shell for securing a laptop computer on the working surface 90. There are front stops 94 and back stops 96 for the laptop computer 200 shown in FIG. 2. In this embodiment the stops 96, four being shown in FIG. 7, are of rubber, are mounted in a channel at the rear end of platform 89 and can slide to a desired position. These help hold the laptop in place when the apparatus is folded for storage. There is a pull-out platform 98 on one side of the second shell for a Palm-Pilot (TM) or other such equipment. The platform 89 is hingedly connected at the rear thereof and opens to provide a storage compartment 100 within the second shell as seen in FIG. 7.

The third shell 86 is generally similar to the second shell, but is smaller as seen in FIG. 1. This has a platform 103 with a working surface 104 for receiving a printer 202, shown in FIG. 2, or other computer equipment. There is an adjustable strap 106 to secure the printer during transport. A paper catcher platform 110 with a paper catcher wire extension 112 extends from the front of the third shell, when open, to support paper outputed from the printer. The platform pivots upwardly to reveal compartment 111 as seen in FIG. 7.

There is a storage compartment 114 within the first shell adjacent bottom panel 30 for storage of a power bar as well as other equipment such as wall socket adapters. Thus a computer 200 can be placed on working surface 90 and secured thereto with the printer 202 on working surface 104 and secured by strap 106 as seen in FIG. 2. The power bar and other equipment can be placed in compartment 114. All of the cables 204, with the exception of a power cable from the power bar when in use, can be located within the first shell behind the second and third shells.

When the traveler wishes to move to a new location, the second and third shells can be pivoted upwardly to the closed positions shown in FIGS. 3 and 4. There are security locks 130 and 132 for the second shell and similar security locks 134 and 136 for the third shell.

The extensions 50 and 52 of side members 46 and 48 are telescoped within the portions 54 and 56 for transport. The U-shaped supports 66 and 68 are pivoted about pins 70 to the positions shown in FIGS. 3 and 4 where the supports are generally parallel to the side members and are spaced apart therefrom so the shells are received between the supports. Front panel 26 has a recess 140 for receiving support 68, while support 66 is received between the second shell 76 and the third shell 86.

There is atop carrying handle 150 connected to the top panel 28 and a side carrying handle 152 connected to side panel 34. The handle 150 is adapted for overhead compartment loading in an aircraft.

A pair of wheels 160 and 162 are rotatably mounted on the first shell 26 adjacent the bottom panel 30. The wheels in this example are inline skate, high-performance wheels which give the user a smooth rolling action while pulling the apparatus. This is assisted by a telescopic handle 170, shown extended in FIG. 5. In this configuration the apparatus is intended to be pulled along the floor utilizing the wheels 160 and 162.

Figure 8:
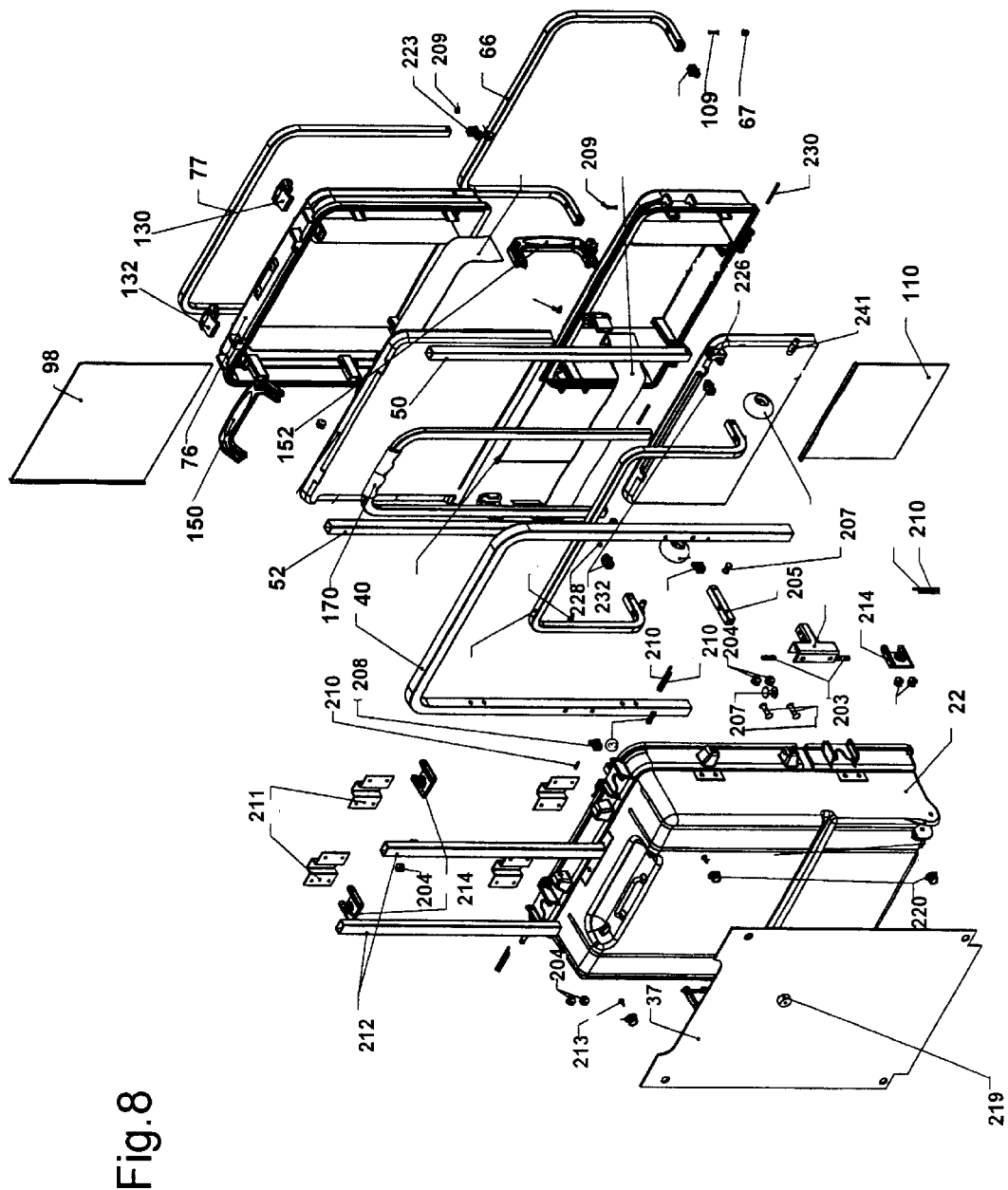
FIG. 8 is an exploded, isometric view thereof.

Referring to FIG. 8, a number of connectors and other such components are shown including pop rivets 204, rivets 207, hinge ends 208, rivets 209, pins 210, handle brackets 211, handle posts 212, screws 213, main locks 214, snap bottoms 219, snap tops 220, hinge end doubles 223, leg stops 226, nuts 228, support stop inserts 232 and wheel axes 241.

It will be appreciated by someone skilled in the art that many of the details provided above are by way of example only and are not intended to limit the scope of the invention which is to be interpreted with reference to the following claims.

What is claimed is:

1. A combined carrying case and workstation for computer components, comprising:

a case having a generally rectangular first shell with a first cavity therein, a front panel, a top panel, a bottom panel, and opposite side panels, and a second shell pivotally connected to the first shell for pivoting between a closed position, where the second shell is against the first shell, to enclose at least a first portion of the first cavity, and an open position where the second shell extends generally perpendicular to the closed position; and a U-shaped frame having a top member extending along the top panel and side members extending along the side panels, the side members being telescopic and having bottoms, a stand, the stand being connected to the bottoms, the frame being extensibly mounted on the case for extension between a retracted position for transport, where the stand is adjacent to the case, and an extended position for workstation use, where the case is spaced-apart above the stand when the stand is positioned on a flat, horizontal surface.

2. A combined carrying case and workstation as claimed in claim 1, having a third shell pivotally connected to the first shell for pivoting between a closed position, where the third shell is against the first shell to enclose a second portion of the first cavity, and an open position, where the third shell extends generally perpendicular to the closed position of the third shell.

3. A combined carrying case and workstation as claimed in claim 2, wherein the third shell is adjacent to the second shell and the second shell and the third shell together enclose the first cavity when the second shell and the third shell are in their closed positions.

4. A combined carrying case and workstation as claimed in claim 3, wherein the second shell and the third shell have flat working surfaces which are generally horizontal when the second shell and third shell are in their open positions, the frame is in the extended position, and the stand is positioned on the flat, horizontal surface.

5. A combined carrying case and workstation as claimed in claim 4, wherein the third shell is below the second shell and is spaced-apart from the second shell in the open positions thereof.

6. A combined carrying case and workstation as claimed in claim 5, wherein the second shell and the third shell have second and third cavities respectively, the cavities being removably covered by the flat working surfaces.

7. A combined carrying case and workstation as claimed in claim 1, wherein the stand includes a pair of U-shaped supports hingedly connected to the bottoms of the side members for pivoting between support positions, on opposite sides of the side members and extending generally perpendicular to the side members, to storage positions where the supports are generally parallel to the side members and spaced apart therefrom, whereby the shells are between the supports when the second and third shells are closed and the frame is in the retracted position.

8. A combined carrying case and workstation as claimed in claim 7, wherein the second shell has means for securing a laptop computer thereto and the third shell has means for securing a printer thereto.

9. A combined carrying case and workstation as claimed in claim 8, wherein the first shell has an internal storage space for a power bar.

10. A combined carrying case and workstation as claimed in claim 9, wherein the first shell has a rectangular opening opposite the front panel, the second shell being hingedly connected to the first shell at a location below the top panel, enclosing the opening between said location and the top panel when the second shell is closed, and extending perpendicularly outwards from said location in the open position thereof.

11. A combined carrying case and workstation as claimed in claim 10, wherein the third shell is hingedly connected to the first shell adjacent to the bottom panel thereof, encloses the opening between the bottom panel and said location when closed, and extends perpendicularly outwards, parallel to the open second shell, when in the open position thereof.

* * * * *